(12) United States Patent
Persson et al.

(10) Patent No.: US 8,616,400 B2
(45) Date of Patent: Dec. 31, 2013

(54) OPENING DEVICE AND METHOD FOR MANUFACTURING THE SAME, AND A PACKAGING CONTAINER PROVIDED WITH SAID OPENING DEVICE

(75) Inventors: Leo Persson, Helsingborg (SE); Anders Danielsson, Hörby (SE); Joakim Tuvesson, Malmö (SE); Pär Andersson, Lund (SE); Håkan Hansson, Staffanstorp (SE); Klaus Specht, Darmstadt (DE); Urban Lundmark, Kävlinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 13/515,575

(22) PCT Filed: Dec. 10, 2010

(86) PCT No.: PCT/EP2010/069392
§ 371 (c)(1),
(2), (4) Date: Jul. 16, 2012

(87) PCT Pub. No.: WO2011/073104
PCT Pub. Date: Jun. 23, 2011

(65) Prior Publication Data
US 2012/0270012 A1    Oct. 25, 2012

(30) Foreign Application Priority Data

Dec. 14, 2009  (CH) ...................... 901551-2

(51) Int. Cl.
*B65D 17/34* (2006.01)
*B65D 17/00* (2006.01)

(52) U.S. Cl.
CPC ...... *B65D 17/165* (2013.01); *B65D 2517/0013* (2013.01)
USPC ......................................... 220/269; 215/304

(58) Field of Classification Search
CPC .. B65D 17/165; B65D 17/163; B65D 17/161; B65D 17/166; B65D 17/16; B65D 2517/0013
USPC ............. 220/269, 268, 266, 265, 260, 254.3, 220/254.2, 254.1, 359.4, 359.3, 359.2, 220/359.1; 215/304, 305, 303, 295, 232, 215/228, 45, 43, 40, 200, 253, 252, 250; 264/273
IPC ....................................................... B65D 17/34
See application file for complete search history.

(56) References Cited

U.S. PATENT DOCUMENTS 4,227,624 A * 10/1980 Hawkins ................. 220/265
5,197,618 A *  3/1993 Goth ....................... 215/232

(Continued)

FOREIGN PATENT DOCUMENTS

EP    0505851 A1    9/1992
EP    0546999 A1    6/1993

(Continued)

OTHER PUBLICATIONS

International Search Report (PCT/ISA/210) issued on Feb. 23, 2011, by the European Patent Office as the International Searching Authority for International Application No. PCT/EP2010/069392.

*Primary Examiner* — Robert J Hicks
(74) *Attorney, Agent, or Firm* — Buchanan Ingersoll & Pooney PC

(57) ABSTRACT

An opening device for a packaging container comprises two operational parts: a membrane part ensuring a secure seal of the packaging container and a support part ensuring rigidity for the opening device. The opening device is characterized in that a membrane portion of the membrane part is mechanically attached to the support part to operate as one piece during opening of the packaging container, and the materials of the membrane part and the support part are thermally incompatible.

13 Claims, 4 Drawing Sheets

(56) References Cited

U.S. PATENT DOCUMENTS

| | | | |
|---|---|---|---|
| 5,287,983 A * | 2/1994 | Reil et al. | 220/258.1 |
| 5,372,300 A | 12/1994 | Nedstedt | |
| 5,381,935 A | 1/1995 | Mock | |
| 5,413,238 A | 5/1995 | Mock | |
| 5,498,225 A | 3/1996 | Nedstedt | |
| 6,845,902 B1 | 1/2005 | Bomer et al. | |
| 2004/0026421 A1 | 2/2004 | Holm et al. | |

FOREIGN PATENT DOCUMENTS

| | | |
|---|---|---|
| EP | 2 020 385 A1 | 2/2009 |
| JP | 06-092350 A | 4/1994 |
| JP | 06-092351 A | 4/1994 |
| JP | 10-338253 A | 12/1998 |
| JP | 2000-128217 A | 5/2000 |
| WO | WO 02/070365 A1 | 9/2002 |
| WO | WO 2008/004939 A1 | 1/2008 |

\* cited by examiner

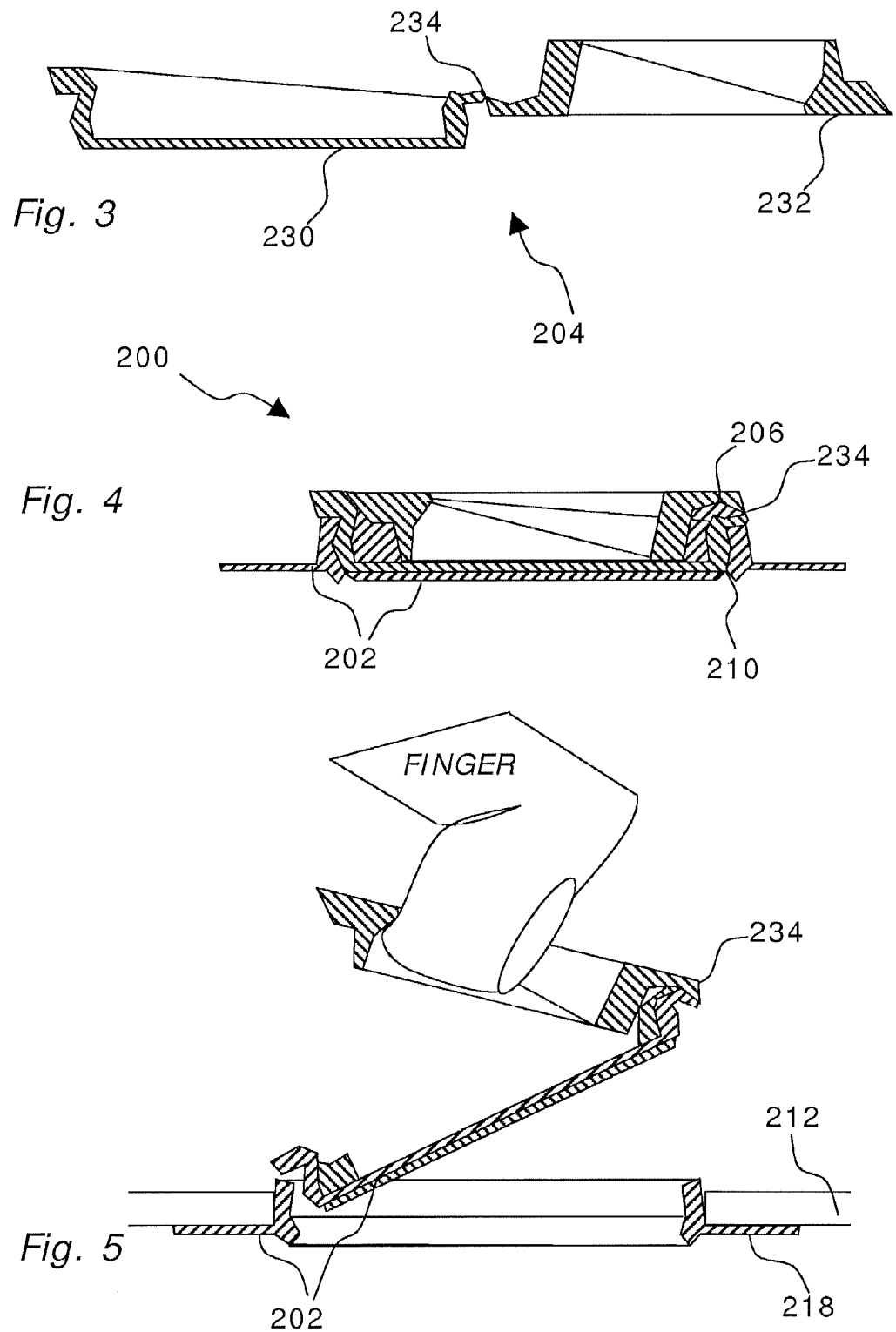

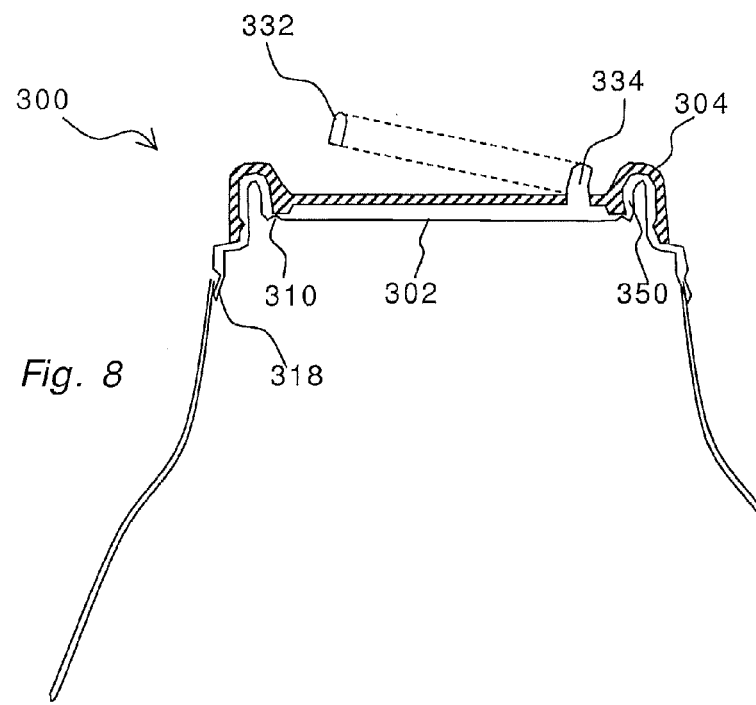
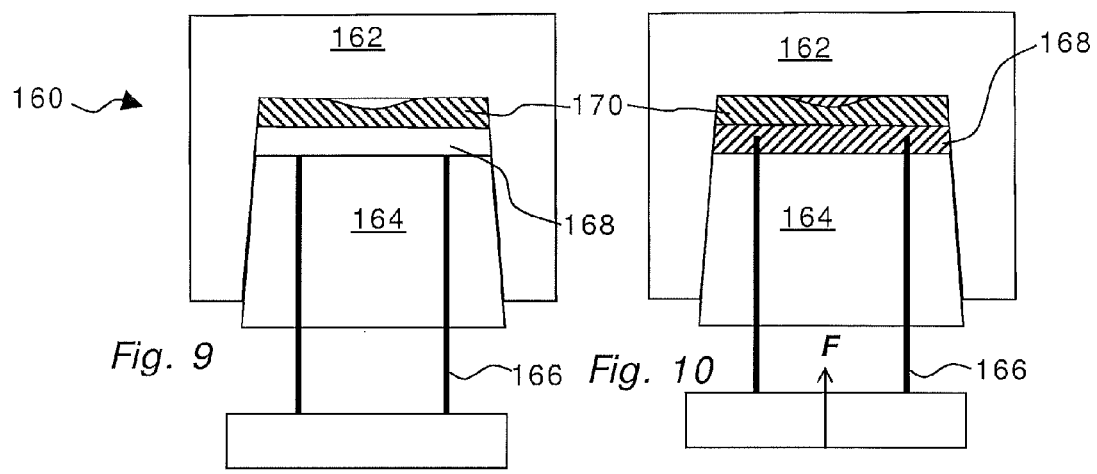

OPENING DEVICE AND METHOD FOR MANUFACTURING THE SAME, AND A PACKAGING CONTAINER PROVIDED WITH SAID OPENING DEVICE

This application is the National Stage of PCT/EP2010/069392, filed Dec. 10, 2010, and claims priority under 35 U.S.C §119 to SE0901551-2, filed Dec. 14, 2009, the entire contents of each of which is incorporated by reference herein.

TECHNICAL FIELD

The present invention relates to an opening device and to a method for manufacturing said opening device. The invention also relates to a packaging container provided with such an opening device.

BACKGROUND

Packaging containers for consumer use are provided with an opening device of some sort. Some preferential features of an opening device are that it should be easy to actuate and provide an adequate and reliable seal for the product contained in the packaging container. The definition of an adequate seal will vary, depending on the type of product contained in the packaging container, and how the packaging container will be stored etc. A common demand is that the opening device, before it is opened the first time, should prevent microorganisms from accessing the product from outside, since this will rapidly deteriorate the quality of the product. In some instances it is also desired to prevent certain gases, such as oxygen, from entering the packaging container. Since a regular screw cap typically does not provide an adequate seal, a membrane is typically added. The membrane seals the opening of the packaging container by providing a continuous mass of material which is typically welded to a rim of the opening of the packaging container. In a case where gases should be prevented from entering the packaging container, this usually accomplished by use of suitable barrier materials for the opening device, the membrane, and the packaging container itself.

An opening device comprising a cap and a membrane is e.g. disclosed in WO02/070365.

U.S. Pat. No. 5,413,238 shows a closure unit having a protection/support zone made from a first material and a pouring part made from a second material. A similar device is disclosed in EP0546999.

SUMMARY

The present invention eliminates or at least alleviates the above problems and reaches the stated purposes by the provision of an opening device comprising a cap part and a membrane part having the characterizing features of claim 1. The opening device may preferably be manufactured using the method of claim 11, and may also be intended for a packaging container in accordance with claim 14. An intermediate product is defined in claim 10. Specific embodiments are defined by the dependent claims.

The use of a mechanical bond or constructional bond between the different parts of the opening device enables the inventive properties. Since the bonding is ensured mechanically the different parts of the opening device may be made of materials that are not thermally compatible, e.g., which does not bond together by the heat present during production, i.e. as the molten plastic for the membrane part is injected into the mould containing the preformed support part. In this context "thermally incompatible", which will be used throughout this specification may be said to imply that the materials are so arranged that their interface surfaces will not fuse, (chemically) bond or adhere during manufacture of the opening device, at least not in any permanent manner. This may also be put in terms of the materials being "non-weldable" to each other under the circumstances of the manufacturing process (variables including temperature, pressure, contact time etc). The skilled person realizes that even if the materials of the preformed support part and the membrane part as such would be weldable or compatible in an adhesive way, the surface of the preformed support part may comprise a coating as to make it incompatible to the material of the membrane part. There are several options for such a non-stick treatment, such as a powder-based compound being applied to one of the surfaces before injection moulding e.g. in the form of a "paint". The feature of absence of an adhesive bond enables new designs for the opening device and its cooperation with a packaging container. Further, this results in that the membrane part may be optimized (material, design) for its purpose, and the support part may be optimized for its purpose as the same time, as long as this criterion is fulfilled. The present invention enables, in one or more embodiments thereof, a true one-action opening where both a membrane seal and a reclosable cap may be removed in one single manipulation, which may considered less cumbersome than the two-step opening of prior art, where a cap has to be removed before a membrane may be accessed.

BRIEF DESCRIPTION OF THE DRAWINGS

FIG. 3 is a schematic cross section of a support part for an opening device in accordance with a second embodiment of the present invention.

FIG. 4 is a cross section of an opening device in accordance with a second embodiment of the present invention, in a closed position thereof.

FIG. 5 is a cross section of the opening of the opening device of FIG. 4, arranged on a packaging container.

FIG. 8 is a view corresponding to FIG. 6, after opening and reclosing of the opening device.

FIGS. 9 and 10 are schematic cross-sectional views of a mould that may be used to manufacture the present invention according to one embodiment thereof, illustrating a sequence performed during manufacture.

DETAILED DESCRIPTION OF EMBODIMENTS

For further elucidation of the functionally and versatility of the present invention exemplifying applications will be elucidated in a detailed description of several various embodiments.

Figure 1:
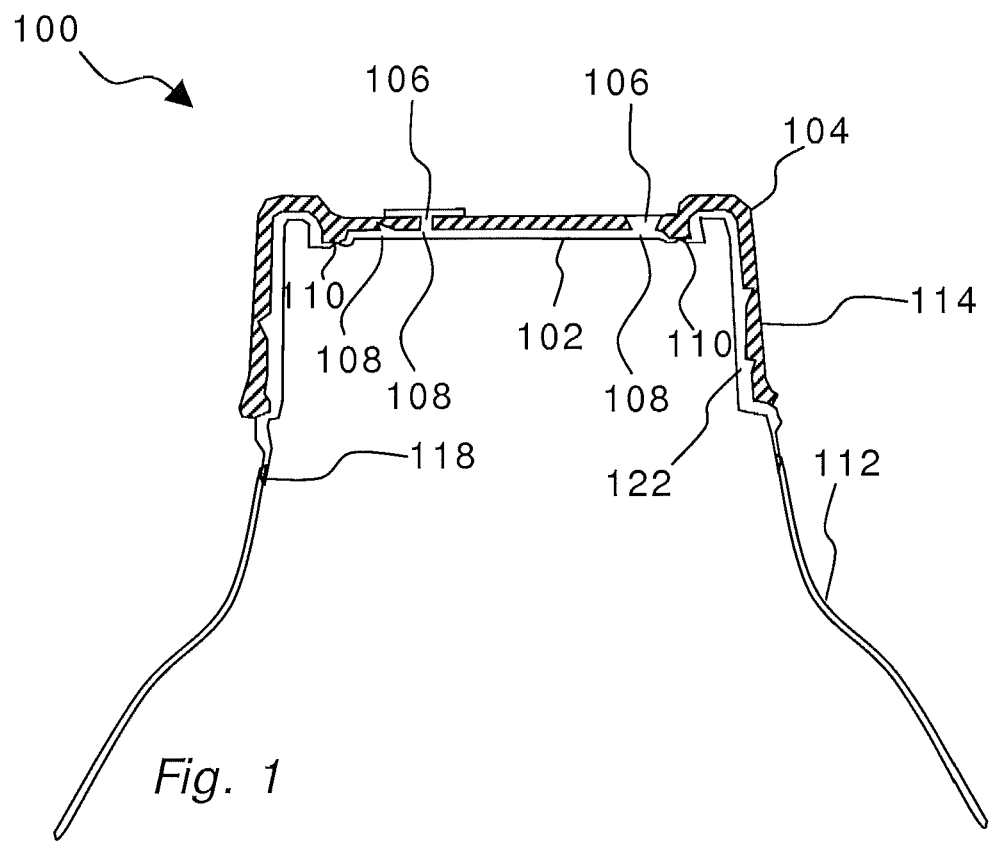
FIG. 1 is a schematic cross section of an opening device in accordance with a first embodiment of the present invention.

FIG. 1 is a cross section of an opening device 100 according to a first embodiment of the present invention. A membrane part 102 extends from a lower side of a support part 104 and has projections 106 extending into openings 108 of the latter. In the openings the support part 104 has an undercut design, such that the membrane part 102 is held in place. The openings 108 may have an essentially conical shape such that the projections 106 may not be pulled out therefrom. The skilled person realizes that there are several designs possible for the openings 108, some of which are illustrated in FIG. 1, and that one way of expressing it may be that the projections 106 comprise a portion having a diameter being larger than the diameter of at least a segment of the opening 108. In this context FIG. 1 also illustrates how the membrane part 102 may be held to the support part 104 by forming "rivet" structures extending through an opening in the support part 104 and comprising a head portion, i.e. an end having an increased diameter. Others examples include inclined flanges extending from the support part, or inclined slits extending into the support part, thus generating undercut sections preventing the two parts of the opening device 100 from separating. There are consequently several ways of achieving the function of holding the membrane part 102 to the support part 104, yet from a practical production standpoint a simple manner of fulfilling this criterion is to provide a conical shape, which may or may not extend completely through the support part.

The membrane part 102 comprises a weakening structure 110. In this first embodiment the weakening structure 110 is effected by a path having a significantly thinner thickness than the other portions of the membrane part 102. The path generally follows the neck shape, or the rim, of the packaging device, and in the present embodiment it thus is essentially circular, yet it may have any shape. The absolute thickness of the membrane part 102 along this weakening path should essentially be as thin as possible, such that it may be readily ruptured. It must, however, have a thickness such that its barrier properties, be it against microorganisms or gases are maintained and a robustness such that it may withstand the expected forces to which it will be subjected during the handling thereof. An example would be a thickness in the order of about 10-100 μm for LDPE, yet it may also be about 150 μm, and about half for HDPE. The thickness will inevitably vary depending on the choice of material, which falls within the competence of the skilled person, and the example is thus only exemplifying.

The purpose of the weakening structure 110 is obviously to provide a well defined rupture path as the opening device 100 is opened, as is well known to the skilled person. In this context it should be mentioned that it is the mechanical cooperation between the support part 104 and the membrane part 102 which transfers the force applied by the user to the weakening path. The mechanical cooperation between the parts is beneficially, but does not have to be, effected by the already discussed projections 106. One example of this may be that the membrane part 102 is held to the support part 104 by a relatively weak structure (basically strong enough to hold the weight of the membrane part to the support part), and that the force needed to rupture the weakening path is transferred via e.g. a sawtooth cooperation between the parts. When the manufacturing method is described later in this description it will be evident that there are numerous alternatives for this force transferring structure as well as for the structure holding the membrane portion to the support part.

In the present embodiment the membrane part 102 may be formed from the same material as the neck of the packaging container 112 on which it is intended to be positioned, or at least a thermally compatible material such that the two may be joined by means of application of heat, that is welded together. The skilled person realizes that there are also other means of joining the materials, such as with an adhesive action, typically provided by a hot melt adhesive, or a sealant, yet the thermal joint by means of a weld is commonly used in the field of the present invention. Thus the membrane part 102 may be formed in one piece with the neck 122 of the packaging container, and the support part 104 together with the membrane portion the screw cap 114 of the opening device. In this context the membrane portion may be defined as the portion of the membrane part 102 which is radially inside of the weakening structure 110. The membrane part 102 extends past the lower end of the support part 104, where an attachment flange 118 is provided. The attachment flange 118 may be used to attach (e.g. weld) the opening device to the neck 122 of a packaging container 112. In another configuration, not shown, the support part 104 may still constitute the cap 114, yet the membrane part 102 only extends to a position just radially outside of the weakening structure 110, where an attachment flange is provided for the same purpose as the previously mentioned attachment flange 118. The present invention should thus not be limited in respect of the position of said flange 118.

The material used for the support part 104 should on the other hand not be thermally compatible with the material of the membrane part 102, such that the two materials do not bond with each other during manufacturing. The significance of this feature is obvious from the illustrations of the present embodiment. Should the two materials bond to each other in any way it simply would be too difficult, not to say impossible, to unscrew the cap. For the present embodiments only a moderate force has to be applied in order to unscrew the cap, and rupture the membrane part 102 along the weakening structure 110. The support part 104 is used as an actuation portion in this embodiment, i.e. the portion via which the force from a user is transferred to the weakening structure of the opening device.

Even after the membrane part 102 has ruptured along the weakening structure 110, it is still possible to reclose the packaging container by using the cap 114, which has internal threads and also a cavity cooperating with the flexible U-shaped flange at the rim of the neck. The radially inner surface of the free end (just radially outside of the weakening path 110 in FIG. 1) of the U-shaped flange will effect the seal, since it will always exert a force directed towards the portion of the support part radially inside of said free end. The fit between the cap and the external threads of the neck, as well as interengaging portions of the two in general is perfect since the support part 104 constitutes part of the mould cavity when the material used for the membrane part 102, and in this case also the threaded neck 122, is injected into the mould cavity.

Figure 2:
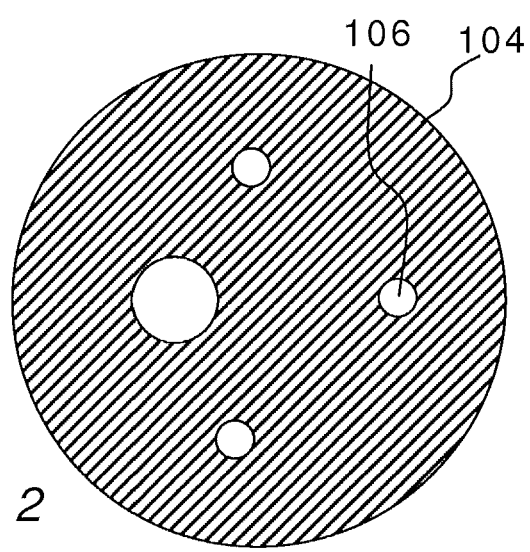
FIG. 2 is a plan view of the opening device in FIG. 1.

FIG. 2 is a schematic plan view of the device of FIG. 1, illustrating the support part 104 with penetrating projections 106.

The second embodiment of the present invention is slightly more elaborate than the first, yet it is based on the same inventive concept. To simplify understanding the same reference numerals have been used, increased by 100, whenever possible. In this embodiment the support part 204 is formed by two portions 230, 232 manufactured in one piece in the folded up position of FIG. 3. The portion 230 to the right of FIG. 3 is the grip portion 230 (being the actuation portion) and the portion to the left is the lid portion 232. The two portions are joined by a material bridge 234 providing a hinge arrangement. The membrane part 202 is formed from a second material, as for the previous embodiments penetrating into openings 208 of the support part 204, as in the first embodiment, as illustrated in FIG. 4. In this case too the skilled person being faced with the present description will realize that there are numerous alternatives for achieving the mechanical attachment between the support part and the membrane part. Also the membrane part 202 comprises a weakening structure 210, having the same purpose and criteria as have already been mentioned in relation to the first embodiment. In the present embodiment the membrane part 202 will provide a pouring spout as well as an attachment flange 218, and the support part 204 will provide a reclosable opening as it snaps into the pouring spout.

The opening device 200 of the present embodiment has the potential of being premade and distributed as a unit to where packaging containers are formed.

According to this embodiment the opening device is opened by gripping and pulling the grip portion 232 at its end remote to the hinge arrangement 234. As shown in FIG. 5 the lid portion 230 will force the membrane part 202 to follow the movement and thus the membrane part 202 will rupture along the weakening line 210. The particular construction of the support portion 204 showed in relation to the second embodiment will provide an adequate concentration of forces for the membrane part 202 to rupture, and make it simple for a user to apply an adequate force.

In an alternative embodiment the support part may be formed by one piece, without the hinge action described, in which case the membrane part 202 could instead start to rupture at the diametrically opposite end of the weakening line as compared to the embodiment described referring to FIGS. 3-5. Again, the fit between interconnecting parts is perfect, due to the inventive method of manufacturing the opening device.

Since the present embodiment relies on a snap fit it is obvious that there are several alternatives for the shape of the opening device as seen from above.

The third embodiment comprises the features of the previous embodiments referring to the cooperation between two separate parts, and the same approach regarding reference numerals has been used. As will be clarified by the following description this embodiment however differs somewhat in that the force applied by a user is applied to a portion of the membrane part 302 instead of to a portion of the support part 304 when opening the opening device 300.

Figure 6:
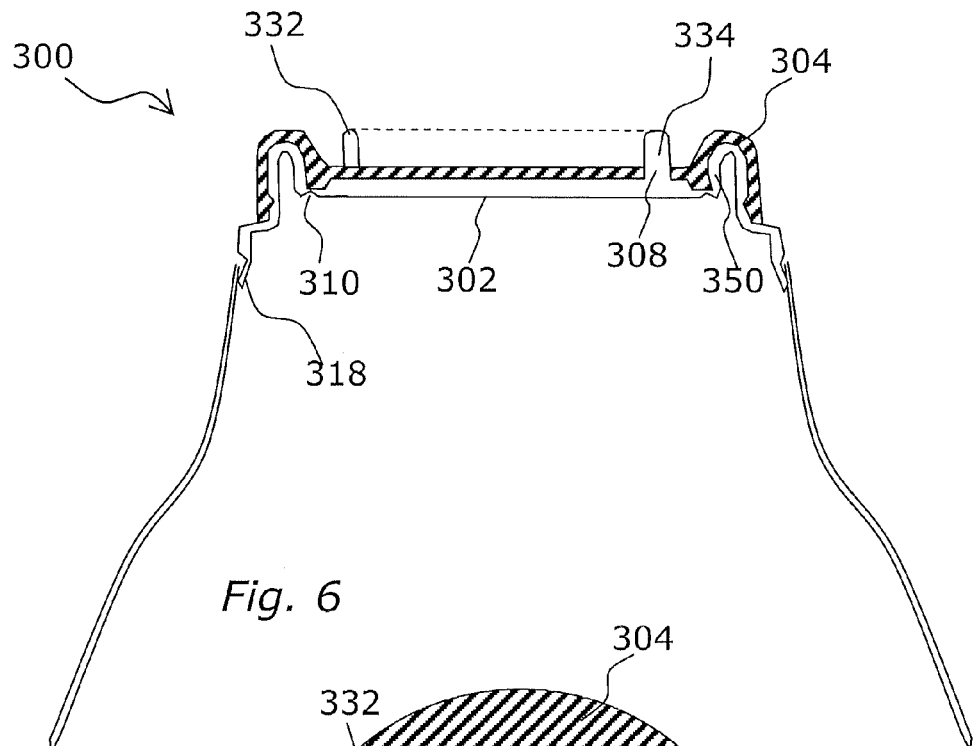
FIG. 6 is a schematic cross section of an opening device in accordance with a third embodiment of the present invention.
Figure 7:
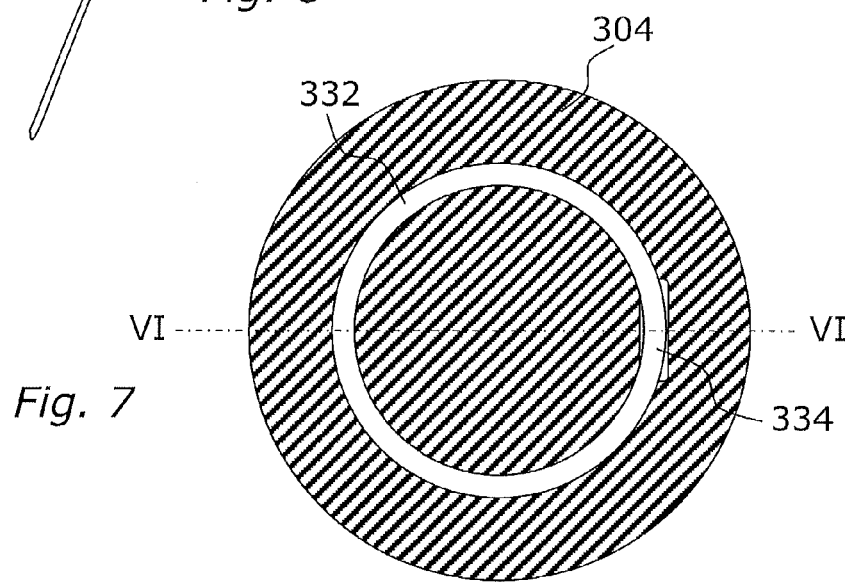
FIG. 7 is schematic plan view of the opening device of FIG. 6.
Figure 11:
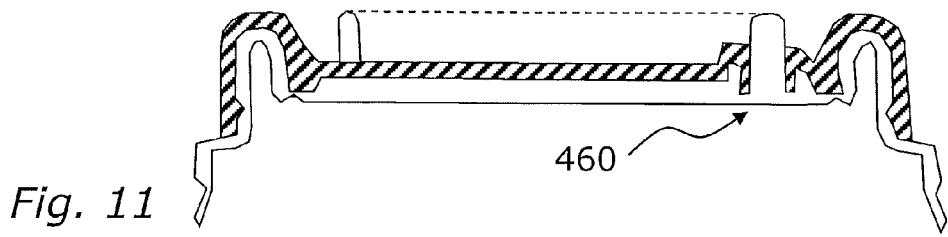
FIG. 11 is a schematic cross section illustrating an opening device according to a fourth embodiment of the present invention.

FIG. 6 is a sectional view of the opening device according to the third embodiment of the invention (along line VI-VI of FIG. 7). Here it is shown how the membrane portion 302 has penetrated through the openings 308 and formed a pull ring 332, providing the actuation portion on the upper side of the support portion 304. A hinge portion 334 has been formed in relation to where the membrane part 302 penetrates opening of the support portion 304.

Both the shape of the support part 302, including the pull ring 332 and the support part 304 may be varied by varying the shape of the mould cavity, as is also true for the other embodiments. The very schematic designs illustrated in these embodiments should obviously not be construed as limiting for design of the present invention. For a screw-cap type opening a circular design is certainly favorable, yet for the opening devices relying on a snap fit, basically any shape is possible, oblong, kidney shaped, rectangular, etc.

Returning to the present embodiment: As the pull ring is pulled the hinge portion 334 will transfer the force to the portion of the membrane part 302 located below the support part 304, which in turn ruptures the membrane part 302 along the weakening line 310 and forces the support part 304 to follow. In this way the opening device 300 is opened.

After the initial opening the opening device 300 is reclosable by the cooperation between the support part 304 and the "neck" of the opening device. There may e.g. be a circumferential bead on the support part 304 cooperating with a matching circumferential groove on the neck portion. Since the support part is used as a preform when moulding the opening device 300 the fit will be perfect with essentially zero tolerance, and the various designs possible for achieving a snap fit, or screw cap are numerous. The radially inner side of the free end 350 of the U-shaped rim of the neck is again useful for effecting a seal against the support portion 304 (i.e. the cap) when reclosing the opening device.

The present embodiment has a built-in tamper evidence. One paramount feature of a tamper evidence is that it should signal to the user if the packaging container has been used or not, e.g. in order to facilitate for the user to choose the correct packaging container in the fridge at home. A tamper evidence of course also has the purpose of ensuring to a user that the packaging container has not been opened before from a hygienic aspect. The latter purpose is actually fulfilled automatically, without the use of a visual tamper evidence since there will be a significant difference in the force that has to be applied when opening the packaging container the first time, since the membrane part 302 has to be ruptured. This difference in force is easily recognized after a short usage, thus providing a tamper evidence. The first purpose is actually also fulfilled automatically, without the need of a material bridge, in the present and like embodiments. As the force is applied via the pull ring 332, the hinge portion 334 will be plastically deformed. Thereby it will not be possible to return the pull ring 332 to its original position, instead it will "flag" that the packaging container 312 has been opened, as shown in FIG. 8. The feature of using a plastic deformation of a constructional part, instead of rupturing it completely, may be considered as an inventive solution on its own.

It should be noted that the embodiment is provided for illustrative purposes only, and there are many plausible designs for the support part, the membrane part with its pull ring, etc. and the invention should therefore not be limited in this aspect. For example, neither of the details has to have an essentially circular design. Since (compression) moulding is the preferred manufacturing method there is no immediate benefit in having circular components, and they may thus have any functional design, such as oval, rectangular, etc.

A functionally equivalent solution to the conical openings of the support part, as defined in the above, would e.g. be to form heads with increased diameter on the projections, as these have passed through the openings, as illustrated by the "rivets" of FIG. 1.

All embodiments of the present invention are preferably manufactured with the same method. This method includes the use of the support part as a preform, which is arranged in a mould cavity before injection of the material for the membrane part. The actual injection of the material for the membrane part is made in a conventional way, and the parameters relating to this will vary with various operational parameters, which may be readily deduced by the skilled person studying the contents of the present invention. The same is valid for the choice of number of and location for injection points, which will vary with e.g. the amount of material to be injected, the shape of the mould cavity etc.

The technique for accomplishing the features of the membrane part may vary, yet a few examples are worth mentioning:

The fact that the membrane part, and in particular the weakening structure should be very thin poses some difficulties, since the material injected into the cavity may not be willing to fill such thin voids. It the voids are not filled, the effect will be an inadequate seal. Therefore a compression moulding technique (or injection compression) may be used, in which the volume of the cavity is reduced after injection of material. Such a technique is described in WO 2008004939.

The lower cavity may e.g. include a ridge facing towards the mould cavity, for forming of a weakening structure.

Another, yet inventive method is disclosed in the cross sections of one particular embodiment shown in FIGS. 9 and 10. Here the mould 160 comprises a first mould half 162 and a second mould half 164, movable in relation to the first mould half 162 and designed to form a moulding cavity 168 between them. The second mould half 164 comprises a movable tool 166 arranged to form the weakening line. This movable tool 166 is movable relative to the second mould half 164 such that before the injected material has hardened the movable tool 166 may be slid (further) into the cavity in order to compress the material thus forming the weakening line and achieving the desired thickness. In one embodiment a manufacturing method thus comprises the steps of; using at least two moulding tools 162, 164 to form a moulding cavity 168; injecting a melt into the cavity 168; advancing a third, movable tool 166 into the moulding cavity 168 to form an area of reduced thickness, e.g. a weakening line. In one or more embodiments the length that the third, movable tool 166 is advanced into the cavity is determined by the force used for advancing it. This force may be determined by using a fix force for the advancement, or by using a control unit able to measure the force and disrupt the advancement once a predetermined force is reached. The moulding cavity 168 has a defined and essentially constant volume, yet as the movable tool 166 advances the volume of the cavity 168 will be reduced and thus the pressure inside the cavity 168 will increase and with that the force needed for advancement of the movable tool 166. This makes it possible to use the force as a measure of the advancement length. The length may also or instead be defined by means of a physical restrictor, restricting the movement of the movable tool 166, yet such an arrangement will not account for wear of the detail in the same way as when the applied force is used. For the present invention a preform is arranged in one mould half, yet the described moulding method and mould used to perform the method may also be used on its on, without the use of a preform.

In the view of FIGS. 9 and 10 a support part 170 is arranged in the first mould half 162, and it is shown how the melt injected into the cavity 168 fills the voids on both sides of the support part 170. The support part may correspond to any one of the support parts already described in this description, and according to this inventive moulding method, a support part does not have to be arranged in the second mould half, or in the mould cavity at all. The skilled person realizes that the drawing illustrates a principle rather than a concrete design and that e.g. the position of the injection points lacks in the drawing and will vary between different mould designs. It is also obvious that the shape of an actual mould would be far more elaborate, including every detail of the design in question.

This inventive technique may also be combined with the regular compression moulding technique.

In any embodiment a trough opening or through hole in the preform may be subject to special arrangements. Such special arrangements may be considered in order to avoid leakage of content through any small clearance created in the area of the through hole due to shrinkage of the injected polymer. According to one or more embodiment the through hole is surrounded by a groove arrangement, basically an operational indentation in the preform, preferably forming a closed path (a loop). During injection the polymer will enter the groove and as the polymer shrinks during cooling it will pinch towards the radially inner edge of the groove. The sealing pinching action may be effected even the groove only consists of a radially inner edge, yet the force holding the two parts together is likely to be stronger if the groove also as a well defined radially outer edge.

The groove arrangement does not have to be in the immediate vicinity of the through hole, as long as the through hole is encircled. One embodiment includes a groove arranged in the area radially inside the weakening line. Such a groove would serve a triple purpose of preventing leakage (as noted above), preventing liquid from entering in a clearance between the preform and the membrane portion, and attaching the membrane portion to the preform. To enhance the function of the groove arrangement it, or at least a radially inner edge of it, may be slightly undercut. This feature will enhance the coupling strength of the arrangement.

Looking at FIG. 1 typical locations for these groove arrangements could be around one or more of the openings 108, or around the through opening for the hinge portion 334 (see e.g. FIG. 6). In FIG. 10, the layout of which should be obvious from the previous description, one example is indicated at the arrow 460.

The invention claimed is:

1. An opening device for a packaging container, comprising two operational parts, a support part configured to ensure rigidity for the opening device and a membrane part configured to ensure a secure seal of the packaging container, wherein a membrane portion of the membrane part is mechanically attached to the support part by means of at least one opening in the support part into which the membrane portion extends to operate as one piece during opening of the packaging container, the membrane part further comprising a weakening line along which it is configured to rupture upon opening, wherein the material of the membrane part is thermally incompatible with a material of the support part to avoid fusion, bonding, or adhesion between the two operational parts during manufacture of the opening device, and wherein the opening is encircled by a groove arrangement radially inside the weakening line, the groove arrangement forming a closed path into which the membrane part extends.

2. The opening device of claim 1, wherein the membrane part extends through the at least one opening of the support part and has dimensions on both sides of said at least one opening exceeding the dimensions of said at least one opening.

3. The opening device of claim 1, wherein the membrane portion of the membrane part is on one side of the support part, and an actuation portion of the membrane part is on the opposite side of the support part.

4. The opening device of claim 1, wherein the support part comprises an actuation portion.

5. The opening device of claim 1, wherein the weakening line comprises a structural weakening arranged to break as a pulling force or twisting force is applied to the opening device, separating the membrane portion from the remainder of the membrane part.

6. A method for manufacturing an opening device as defined in claim 1 comprising the steps of:
arranging a preform in a first mould half,
arranging at least a second mould half in engagement with the first mould half for formation of a mould cavity,
injecting a melt into the mould cavity, whereby the melt at least partly penetrates through openings of the preform, such that the preform may provide a support part for the opening device and the injected melt a membrane part of the opening device,
wherein the material of the membrane part is thermally incompatible with a material of the support part to avoid fusion, bonding, or adhesion between the two operational parts during manufacture of the opening device.

7. The method of claim 6, wherein the preform comprises openings extending partly or fully through the preform into which the melt may propagate.

8. The method of claim 6, further comprising the step of, following the step of injecting the melt, advancing a movable part inside the mould cavity to reduce the volume of the mould cavity locally and form a weakening line in the membrane part.

9. A packaging container provided with an opening device according to claim 1.

10. The packaging container of claim 9, wherein the membrane part is formed in one piece with or welded to a neck of the packaging container.

11. The opening device of claim 1, wherein at least the membrane part is made from plastic.

12. The method of claim 6, wherein at least the material of the membrane part is plastic.

13. The opening device of claim 1, wherein the membrane part extends through the at least one opening of the support part and said at least one opening has a conical cross section.

\* \* \* \* \*